W. J. FRANCKE.
FLEXIBLE COUPLING.
APPLICATION FILED JAN. 10, 1917.
1,245,696.
Patented Nov. 6, 1917.
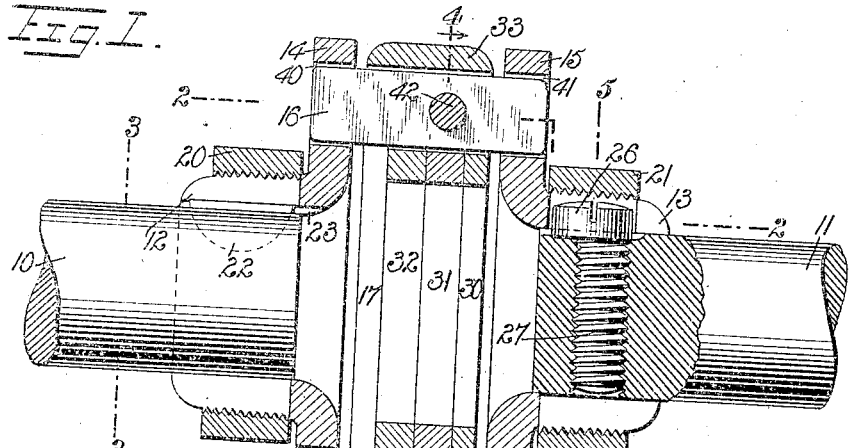
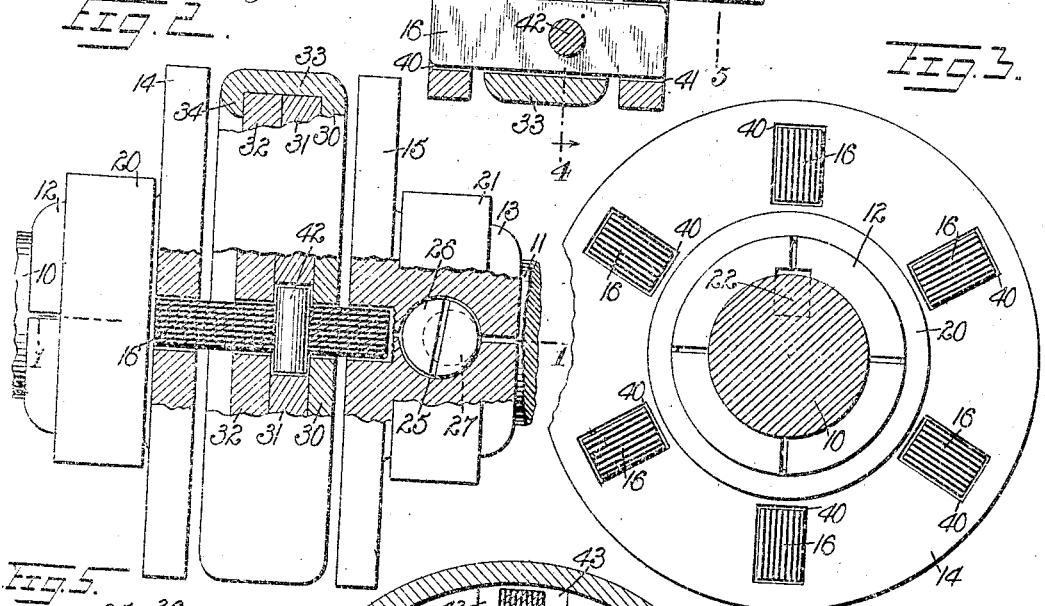
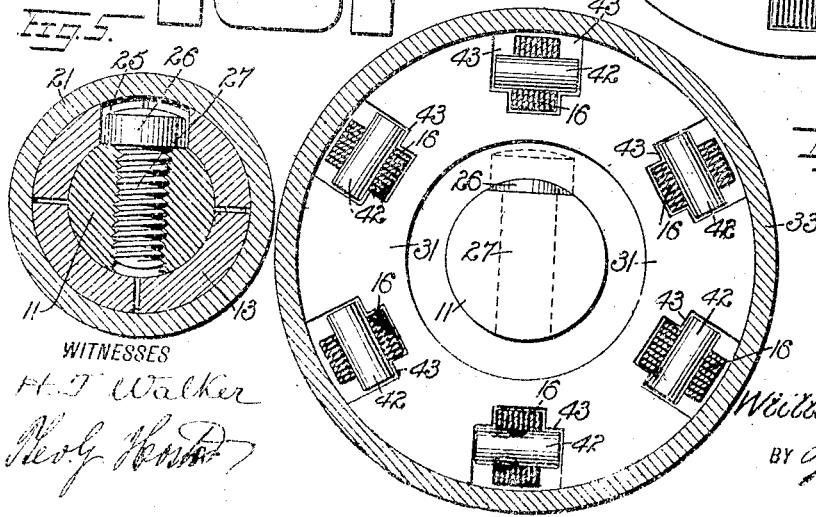
WITNESSES
INVENTOR
William J. Francke
BY
ATTORNEYS

UNITED STATES PATENT OFFICE.

WILLIAM J. FRANCKE, OF HIGHLAND PARK, NEW JERSEY, ASSIGNOR TO THE FRANCKE COMPANY, OF NEW BRUNSWICK, NEW JERSEY, A CORPORATION OF NEW JERSEY.

FLEXIBLE COUPLING.

1,245,696.        Specification of Letters Patent.        Patented Nov. 6, 1917.

Application filed January 10, 1917. Serial No. 141,574.

*To all whom it may concern:*

Be it known that I, WILLIAM J. FRANCKE, a citizen of the United States, and a resident of Highland Park, in the county of Middlesex and State of New Jersey, have invented a new and Improved Flexible Coupling, of which the following is a full, clear, and exact description.

The invention relates to flexible couplings such as shown and described in the application for Letters Patent of the United States, No. 7008, filed February 9, 1915, allowed January 11, 1916, and reallowed September 29, 1916, under Serial No. 121,507.

The object of the invention is to provide a new and improved flexible coupling, more especially designed for use on shafts of small diameter and requiring an accurate, steady transmission of the power such, for instance, as is used on the shafts of magnetos to insure proper ignition of the explosive charge in internal combustion engines.

In order to accomplish the desired result use is made of coupling members adapted to be secured to the adjacent ends of two shafts, flexible connecting means connecting the coupling members with each other, and adjusting means engaging one of the shafts and its coupling member to rotatably adjust this coupling member on the shaft.

A practical embodiment of the invention is represented in the accompanying drawings forming a part of this specification, in which similar characters of reference indicate corresponding parts in all the views.

Figure 1 is a longitudinal central section of the flexible coupling as applied to the ends of two shafts, of which one is partly shown in section;

Fig. 2 is a plan view of the same with parts in section, on the line 2—2 of Fig. 1;

Fig. 3 is a cross section of the same on the line 3—3 of Fig. 1;

Fig. 4 is a similar view of the same on the line 4—4 of Fig. 1; and

Fig. 5 is a similar view of the same on the line 5—5 of Fig. 1.

On the adjacent ends of the two shafts 10 and 11 to be coupled together are fastened the hubs 12 and 13 of two coupling members 14 and 15 connected with each other by flexible connecting members 16 mounted on a floating member 17 arranged intermediate the coupling members 14 and 15. The coupling members 14 and 15 are preferably made of pressed steel disks with the hubs 12 and 13 formed integrally thereon, the hubs being split lengthwise and made slightly tapering and threaded exteriorly for nuts 20 and 21 to screw on said hubs with a view to clamp the split hubs on the adjacent ends of the shafts 10 and 11. A key 22 set in the shaft 10 is adapted to engage a key slot 23 formed in the hub 12 to provide a positive connection between the coupling member 14 and its shaft 10. The hub 13 of the coupling member 15 is provided with an aperture 25 into which fits the head 26 of a screw 27 screwing diametrically in the shaft 11, the head 26 being eccentric to the screw so that when the head is turned at the time the nut 21 is removed then the coupling member 15 is turned on the shaft 11 to provide a desired adjustment between the coupling members 14 and 15 and their shafts 10 and 11 independent of the flexible connecting members 16.

The floating member 17 is formed of a plurality of rings 30, 31 and 32 arranged face to face and with the ring 30 provided with a rim 33 extending peripherally across the peripheral faces of the other rings 31 and 32. The rim 33 is provided with an inwardly extending flange 34 engaging the outer face of the ring 32 to securely hold the rings fastened together.

The flexible connecting members 16 are each formed of a bunch of flat springs or shims, fitting at their ends into apertures 40 and 41 formed in the coupling members 14 and 15, the flexible connecting members being arranged in a circle, the center of which coincides with the axis of the corresponding coupling member 14 or 15. Each flexible connecting member 16 is provided with a pin 42 seated at its projecting ends in a seat 43 formed in the middle ring 31 to hold the flexible connecting members against longitudinal movement but to allow the same to flex at their ends.

From the foregoing it will be seen that a proper driving connection is had between the shafts 10 and 11 even should the latter be out of alinement or out of center, as the coupling members 14 and 15 can readily assume the various positions one relative to the other. It will also be noticed that the coupling member 15 can be individually shifted on its shaft 11 on turning the head 26 of the screw 27, as previously explained, so that minute adjustment is had in the driving connection between the two shafts whether the same are in alinement, out of alinement, or out of center. Thus the flexible coupling is especially serviceable in shafts connected with a magneto used for insuring proper ignition of the explosive mixture in the cylinders of an internal combustion engine and at the proper time.

Having thus described my invention, I claim as new and desire to secure by Letters Patent:

1. In a flexible coupling, the combination of coupling members having hubs adapted to fit on the adjacent ends of two shafts, a floating member intermediate the said coupling members, flexible connecting members mounted on the said floating member and engaging the said coupling members, and means for rotatably adjusting a coupling member on its shaft.

2. In a flexible coupling, the combination of coupling members having split hubs adapted to fit on the adjacent ends of two shafts, nuts screwing on the said hubs to clamp the latter in place on the shafts, flexible connecting means connecting the said coupling members with each other, and a screw screwing in one of the shafts and having a round eccentric head engaging an aperture in the hub of the coupling member on this shaft.

3. In a flexible coupling, the combination of shafts to be coupled together, coupling members adapted to fit on the adjacent ends of the shafts, flexible connecting means connecting the coupling members, and adjusting means engaging one of the shafts and its coupling member to rotatably adjust this coupling member.

4. In a flexible coupling, the combination of shafts to be coupled together, coupling members adapted to fit on the adjacent ends of the shafts, flexible connecting means connecting the coupling members, and a screw screwing in one of the shafts and having a head engaging the coupling member on this shaft to rotatably adjust this coupling member on its shaft.

5. In a flexible coupling, the combination of coupling members having conical split hubs threaded exteriorly and adapted to fit on the adjacent ends of two shafts to be coupled together, nuts screwing on the said hubs to fasten the same in place on the shafts, a floating member intermediate the said coupling members, and bunches of flat springs held in the said floating member and having their ends engaging the said coupling members.

6. In a flexible coupling, the combination of coupling members adapted to be secured to the adjacent ends of two shafts, a floating member intermediate the said coupling members, and flexible connecting members mounted on the floating member and engaging the said coupling member, the said coupling members and the said floating member being formed of pressed steel, and the coupling members having hubs fitting the ends of the shafts.

7. In a flexible coupling, the combination of coupling members adapted to be secured to the adjacent ends of two shafts, a floating member intermediate the said coupling members, and flexible connecting members mounted on the floating member and engaging the said coupling member, the said coupling members and the said floating member being formed of pressed steel, and the coupling members having hubs fitting the ends of the shafts, and the said floating member being formed of a plurality of disks of pressed steel fastened together face to face.

8. In a flexible coupling, the combination of coupling members adapted to be secured to the adjacent ends of two shafts, a floating member intermediate the said coupling members, and flexible connecting members mounted on the floating member and engaging the said coupling member, the said coupling members and the said floating member being formed of pressed steel, and the coupling members having hubs fitting the ends of the shafts, the said floating member being formed of a plurality of disks of pressed steel fastened together face to face, one of the outermost disks having a rim fitting around the peripheral faces of the other disks.

9. In a flexible coupling, the combination of coupling members adapted to be secured to the adjacent ends of two shafts, a floating member intermediate the said coupling members, and flexible connecting members mounted on the floating member and engaging the said coupling member, the said coupling members and the said floating member being formed of pressed steel and the coupling members having hubs fitting the ends of the shafts, the said floating member being formed of a plurality of disks of pressed steel fastened together face to face, one of the outermost disks having a rim fitting around the peripheral faces of the other disks, the said rim having an inwardly extending flange engaging the outer face of the other outermost disk.

WILLIAM J. FRANCKE.